March 12, 1963  R. R. REDDY  3,080,633
SEPARABLE FASTENER
Filed June 29, 1960  2 Sheets-Sheet 1
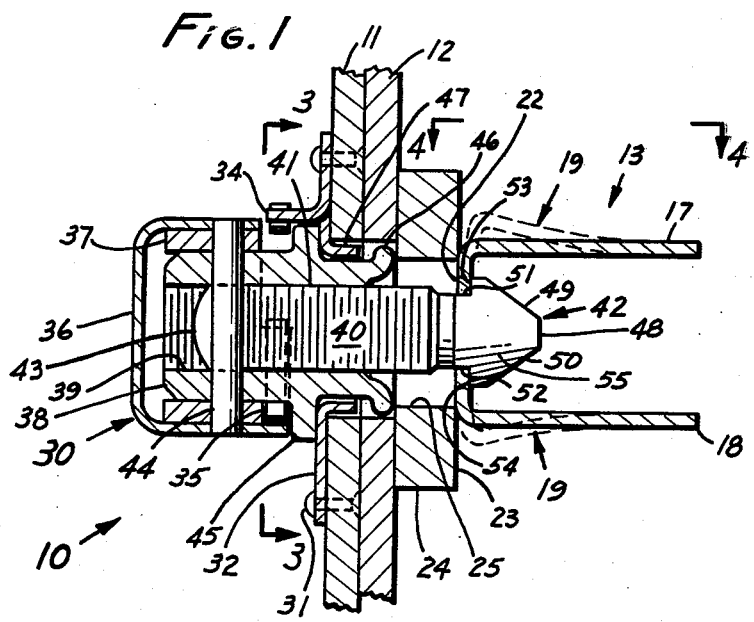
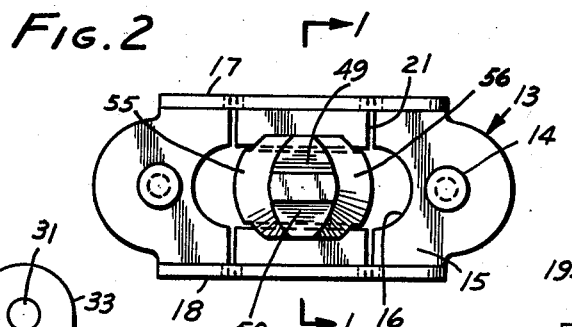
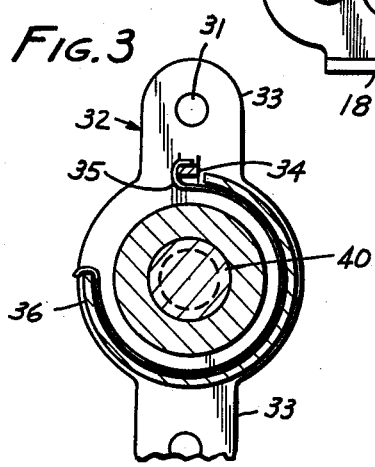
INVENTOR.
ROBERT R. REDDY
BY
ATTORNEYS.

March 12, 1963 R. R. REDDY 3,080,633
SEPARABLE FASTENER
Filed June 29, 1960 2 Sheets-Sheet 2
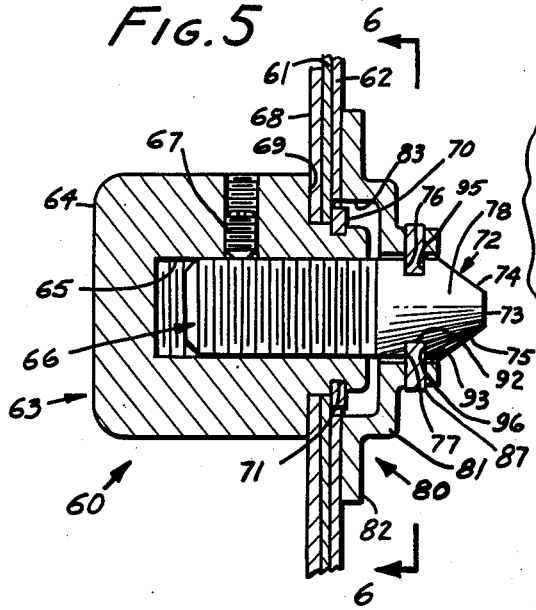
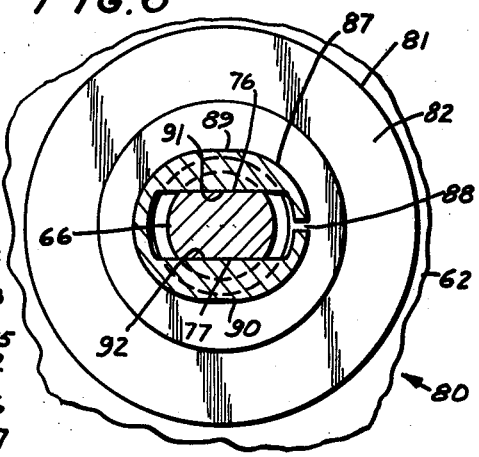
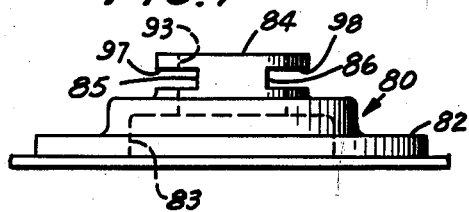
INVENTOR.
ROBERT R. REDDY
BY
ATTORNEYS.

United States Patent Office 3,080,633
Patented Mar. 12, 1963

3,080,633
SEPARABLE FASTENER
Robert R. Reddy, Pasadena, Calif., assignor to Hi-Shear Rivet Tool Company, Torrance, Calif., a corporation of California
Filed June 29, 1960, Ser. No. 39,589
5 Claims. (Cl. 24—221)

This invention relates to a separable fastener for joining two objects together.

An objective of this invention is to provide a fastener of the type generally known as a panel fastener which is able to join two objects, such as a cover plate and an outlet box, or the two ends of a clamp hanger assembly for cables or hose, so that they can be readily engaged and disengaged. This fastener may be joined by a simple push on one of its parts, and released by a quarter-turn of the same part.

An additional object of the invention is to provide a firmly braced fastener of this type wherein the structures being joined lend their strength to that of the fastener so that the fastener itself is stronger than other devices of the same general type.

A related but optional objective of the invention is to provide an adjustment feature enabling a single fastener to be adjusted to carry out its function in joining objects having a wide range of grip thicknesses.

A separable fastener according to this invention includes a receptacle and a plunger assembly, each of which is attached to a respective one of the objects to be joined. The plunger is adapted to pass through an aperture in the receptacle, and carries a pair of shoulders adapted to engage a back surface of the receptacle, and it is a feature of this invention that this back surface is reinforced by structure connected to the object to which the receptacle is attached. The dimensions of the plunger and aperture are different in axes which lie angularly apart from each other and normal to the longitudinal axis of the plunger, so that the plunger and back surfaces can be engaged at one rotational position of the plunger, and disengaged from each other at another rotational position of the plunger.

According to a preferred but optional feature of the invention, the receptacle includes a base portion which is adapted to be attached to one of the objects, and which has an aperture therein. A pair of flanges are integral with the base portion and they extend away from the same on opposite sides of the aperture. There is a leaf spring integral with each of these flanges, each leaf spring having a flexing arm integral with its respective flange at a point spaced from the base plate and extending toward it. Each of the leaf springs also has an inwardly extending engaging arm that is integral with the flexing arm and which lies in the aperture with its lower surface preferably substantially co-planar with the lower surface of the base portion so it will abut the object to which the receptacle is attached and at least partially overlie both the hole in the object, and a portion of the back surface of the object. The plunger assembly includes a plunger that is adapted to pass through the holes in the objects to be joined and includes a pair of slanted surfaces lying on opposite sides of it near one end thereof. These surfaces are adapted to be pressed through the engaging arms, so as to spread the arms apart when passing between them. Slots on the opposite sides of the plunger are positioned adjacent to the slanting surfaces into which the engaging arms can snap after the slanting surfaces pass through. There are two expeller surfaces angularly displaced from the slots and axially even with them, which expeller surfaces taper away toward the end of the plunger so that when the plunger is turned, the expeller surfaces cam the leaf springs out of the slots and, when they engage the expeller surfaces, cooperate with the springs to expel the plunger from the aperture, thereby separating the fastener and allowing the objects to come apart.

Another preferred but optional feature of the invention resides in means for adjusting the grip length of the fastener by providing threads on the plunger and internal threads in the button so that they can be threaded together, combined with means for holding the plunger at some rotationally adjusted position in the button.

Still another preferred but optional feature of the invention resides in spring means which bias the button to the position which tends to align the slots with the leaf springs.

Still another preferred but optional feature of the invention resides in providing the leaf springs as arms of a slotted disc held by a retainer, instead of as portions of flanges.

The above and other features of this invention will be fully understood from the following detailed description and the accompanying drawings, in which:

FIG. 1 is a side elevation, partly in cutaway cross-section, showing the presently-preferred embodiment of the invention;

FIG. 2 is a right-hand end view of the structure of a portion of FIG. 1;

FIG. 3 is a cross-section taken at line 3—3 of FIG. 1;

FIG. 4 is a side view taken at line 4—4 of FIG. 1;

FIG. 5 is a cross-section view of another embodiment of the invention;

FIG. 6 is a cross-section taken at line 6—6 of FIG. 5; and

FIG. 7 is a side elevation of the structure shown in a portion of FIG. 5.

The presently preferred embodiment of a separable fastener 10 according to the invention is shown in FIG. 1, wherein it is acting to join objects 11, 12 together. Object 11 might be such as a cover plate for a junction or fuse box of which panel 12 might be the stationary box structure.

A receptacle 13 is attached to object 12 by rivets 14 (FIG. 2). The receptacle has a base portion 15 with an aperture 16 therein. Integral with and extending normally to the base portion, there are two opposed flanges 17, 18 which are parallel to each other on opposite sides of the base portion. Each of these flanges, which is best shown in FIG. 4, are slotted to form a leaf spring 19 which extends downwardly from that end of the flange which is farthest removed from the base portion.

FIG. 4 shows a flexing arm 20 of the spring, and FIG. 2 shows an engaging arm 21, these arms being integral with each other. The entire receptacle may be formed up from a single piece of sheet metal. As can best be seen in FIG. 1, the bottom surface 22 of each of the leaf springs, when the springs are in their unflexed condition, is substantially co-planar with the bottom of the base portion. This is so that the engaging arms can abut against the adjoining surface 23 of the object to which it is attached. A spacer 24 is shown in FIG. 1 which is attached to the object along with the receptacle. The spacer may be considered a portion of the objects being joined, and is provided for the purpose of increasing the length of the hole to accommodate certain structure yet to be described with greater facility, when desired. It will be observed that the leaf springs at least partially overlie hole 25, and also partially overlie solid structure of the object for buttressing purposes yet to be described. It is to be understood that the bottom surface of each of the leaf springs may project below the bottom surface of the base portion, if desired, for an installation where the hole 25 might be counterbored, or where it might be desired to have the leaf springs seat at a level different from that of the bottom of the base portion.

A plunger assembly 30 is attached by rivets 31 to object 11. This plunger assembly includes a retainer 32 (see FIG. 3) with ears 33 for attachment purposes. An upstanding lug 34 acts to retain one end of a spring 35. The other end of the spring engages a portion of a button 36 so as to bias the plunger assembly counter-clockwise in FIG. 3.

The button includes an internal annular spacer 37 and a nut 38 having an internally threaded passage 39. A plunger 40 has an exteriorly threaded shank 41 which threads into passage 39 and has a head 42 which projects beyond the same. The distance by which the head extends from the button can be adjusted by threading the shank in and out of the nut. The shank has a clevis 43 on its end through which a pin 44 can pass, said pin also passing through the button so as to join the two together. It will be seen that the plunger can be rotationally adjusted every 180°, thereby providing incremental adjustment of the length by which the plunger projects beyond the button.

The button is provided with a collar 45 on the nut which abuts against one surface of the retainer, and an upset shoulder 46 which is engageable with a flange 47 on the retainer so that the button has some small axial play relative to the retainer, but is held by this collar and the flange against falling out of the retainer and thereby becoming separated from the object.

The plunger head has adjacent to its end 48 a pair of slanted surfaces 49, 50 on opposite sides thereof. These surfaces taper toward each other and toward end 48. They terminate near a pair of slots 51, 52 formed on opposite sides of the plunger in angular alignment with the slanted surfaces, these slots forming shoulders 53, 54 over which the engaging arms of the receptacle can snap.

This same end of the plunger has a pair of expeller surfaces 55, 56 which are opposed across the plunger from each other and lie between the slanted surfaces. They extend to a location axially even with slots 51 and 52 so that when the plunger is rotated 90° they act to cam the engaging arms of the leaf springs out of the slots, and then cooperate with the leaf springs to expel the plunger from the aperture.

Another embodiment of the invention is shown in FIGS. 5–7. This fastener 60 is adapted to join objects 61, 62 together. It includes a plunger assembly 63 which incorporates a button 64 having an internally threaded passage 65 into which an externally threaded shank of a plunger 66 is threaded and held by set screw 67. A shim 68 may be provided between object 61 and shoulder 69 on the button so that a single button may be used for a wide range of plate thicknesses. A snap ring 70 seated in groove 71 holds the button to the object. The button is rotatable.

The plunger has a head 72 at end 73. At this end there are two slanted surfaces 74, 75 that are on opposite sides of the head from each other and slant toward each other and toward end 73. Two slots 76, 77 are disposed on opposite sides of the head and are angularly aligned with the slanted surfaces. Two tapered expeller surfaces, surface 78 being shown, are disposed 90° from the slots and are axially aligned therewith. They taper toward each other and toward end 73. The slanting surfaces and expeller surfaces on plunger 66 are identical to those of plunger 40 of FIG. 1.

Receptacle assembly 80 includes a retainer 81 which has a skirt 82 by means of which the receptacle assembly may be attached to object 62. The retainer has a recess 83 to clear the button, and a tubular extension 84. A pair of slits 85, 86 (FIG. 7) are cut in opposite sides of the tubular extension to receive a spring disc 87 (FIGS. 5 and 6). The disc has a split 88 which forms two engaging arms 89, 90 which have interior flat edges 91, 92, respectively. This disc is snapped over the tubular extension with the flat edges standing in slits 85, 86 well within passage 93 inside the tubular extension so that the flat edges will be in position to engage shoulders 95, 96 which bound one side of slots 76, 77, respectively, of the plunger head.

Adjacent surfaces 97, 98 in the tubular extension serve to brace the disc when the plunger is pulled to the left in FIG. 5.

The operation of the embodiments of this invention will now be described. When the embodiment of FIGS. 1–4 is to be put together, the slots are angularly aligned with the engaging arms of the leaf springs and then the plunger is pressed into the aperture so that the engaging arms snap over the shoulders on the plunger and thereby hold the plunger in place. Then the engagement between collar 45 and the retainer acts in opposition to the engagement between the engaging arms and shoulders 53, 54 to hold the objects together. It will be observed that in contrast to previous devices of this type, the actual engagement of the two devices is buttressed by the adjoining face of the object, such as by spacer 24, such that an axial pull to the left on the plunger in FIG. 1 merely moves the engaging arm more tightly against the object so that the object lends its strength to that of the fastener. Previous devices of this type have ordinarily had springs far removed from the object which had only their own strength to hold the devices together, and were thereby susceptible to being disengaged by vibrational forces. This device overcomes that defect.

To permit the objects to separate, the button is given a quarter turn so that the expeller surfaces cam the engaging arms out of the slots, and then the ends of the tips of the engaging arms are on a pair of tapered surfaces so that their force provides a component tending to expel the plunger from the aperture and thereby aids in separating the objects.

This device thereby provides an effective and strong separable fastener which utilizes the strength of the objects which it joins to provide a more effective joinder.

The embodiment of FIGS. 5–7 operates in a similar manner. The button is turned so that the slanted surfaces are aligned with the flat edges 91, 92 of the disc, and the plunger is then forced in until the engaging arms snap into the slots in the plunger. The plunger assembly is now firmly locked to the retainer assembly, and if one were to pull the plunger to the left in FIG. 5, the disc would be found to be as firmly braced as the engaging arms of the embodiment of FIGS. 1–4. To release the plunger from the retainer, the button and plunger are given a quarter-turn so that the expeller surfaces are in contact with the flat edges and the plunger head is thereby expelled from the disc and the device is separated.

The device of FIGS. 5–7 can be provided with a spring return, tending to return the plunger to its locking or engaging position, and instead of the flat-type spring shown in FIGS. 1–4, an ordinary spring wound from wire may instead be used on either of the embodiments of this invention, and also a plurality of spring attachments may be provided so that the tension of the spring may be adjusted.

This invention is not to be limited by the embodiments shown in the drawings and described in the description which are given by way of example and not of limitation, but only in accordance with the scope of the appended claims.

I claim:

1. A separable fastener for detachably securing two objects together, each object having a hole therethrough, said fastener comprising: a receptacle, said receptacle including a base portion adapted to be attached to a first of said objects, and having an aperture therethrough having an axis, springing means attached to said receptacle including a pair of opposite engaging arms adapted to enter the aperture and at least partially overlie the hole in the object to which the receptacle is attached, and also to at least partially overlie structure of that object surrounding that hole, a portion of each of said engaging arms lying in a plane where it is axially braced by structure connected to the last-named object; and a plunger assembly, said plunger assembly including a plunger adapted to pass through said holes, the plunger bearing a pair of slanted surfaces lying on opposite sides of a first end of said plunger and adapted to be pressed between and past the engaging arms, the plunger also bearing a slot on each side of said plunger angularly aligned with the slanted surfaces, a shoulder on the other side of the slanted surfaces from said first end and bounding one side of the slot, the engaging arms snapping into the slots and engaging the shoulders to lock the fastener, the plunger bearing a pair of expeller surfaces on opposite sides of the plunger, a portion of each of which is axially even with the slots, which slots are axially even with each other, said expeller surfaces tapering toward each other from the slots to said first end for expelling the plunger from the aperture when the plunger is turned so that the engaging arms leave said slots and engage the expeller surfaces, and means for holding the plunger to the second of said objects, the shoulders, engaging arms, and object structure serving as mutual buttressing when the plunger is engaged by the receptacle.

2. A separable fastener according to claim 1 in which the springing means comprises a flat disc having a central split bounded by a pair of interior walls, the split dividing a portion of the disc into two engaging arms, the disc being sufficiently flexible, and also being so attached to the receptacle, that the engaging arms are adapted to be sprung apart to pass the shoulder of the plunger and to snap into the slots.

3. A separable fastener according to claim 2 in which the receptacle includes a tubular section forming said aperture, having a pair of opposed open slits therethrough, the disc being snapped over the tubular section with the said interior walls entering into the aperture through the slits so as to be axially supported in the slits by the receptacle and to be movable radially apart by rotation of the plunger.

4. A separable fastener for detachably securing two objects together, each object having a hole therethrough, said fastener comprising: a receptacle, said receptacle including a base portion adapted to be attached to a first of said objects and having an aperture therethrough, a pair of flanges integral with the base portion and on opposite sides thereof, said flanges being substantially normal to the base portion and parallel to each other, a leaf spring integral with each of said flanges, each leaf spring having a flexing arm integral with its respective flange at a point spaced from the base plate, and extending toward it, and an engaging arm integral with each flexing arm and lying in the aperture, with a surface substantially co-planar with the lower surface of the base portion which abuts the object to which the receptacle is attached and at least partially overlie the hole in the first object and also to at least partially overlie structure of the first object surrounding that hole; and a plunger assembly, said plunger assembly including a plunger adapted to pass through said holes, the plunger bearing a pair of slanted surfaces lying on opposite sides of a first end of said plunger and adapted to be pressed through the engaging arms, the plunger also bearing a slot on each side of said plunger angularly aligned with the slanted surfaces, a shoulder on the other side of the slanted surfaces from said first end and bounding one side of the slot, the engaging arms snapping into the slots and engaging the shoulders to lock the fastener, the plunger also bearing a pair of expeller surfaces on opposite sides of the plunger, a portion of each of which is axially even with the slots, which slots are axially even with each other, said expeller surfaces tapering toward each other from the slots to said first end for expelling the plunger from the aperture when the plunger is turned so that the engaging arms leave said slots and engage the expeller surfaces, and means for holding the plunger to the second of said objects, the shoulders, engaging arms, and object structure serving as mutual buttressing when the plunger is engaged by the receptacle.

5. A separable fastener according to claim 4 in which grip length adjusting means are provided, comprising: threads on said plunger; a button having an internally threaded opening into which the plunger is threadable so as to adjust the distance by which the shoulders stand from the button; and means for retaining the plunger and button in a rotationally adjusted position relative to each other.

References Cited in the file of this patent

UNITED STATES PATENTS

| | | |
|---|---|---|
| 1,648,200 | Schulze | Nov. 8, 1927 |
| 2,021,241 | Mall | Nov. 19, 1935 |
| 2,200,702 | Oddie | May 14, 1940 |
| 2,283,125 | Powell | May 12, 1942 |
| 2,334,046 | Tinnerman | Nov. 9, 1943 |
| 2,350,255 | Shippee et al. | May 30, 1944 |
| 2,416,873 | Gorfin | Mar. 4, 1947 |
| 2,530,083 | Ruch | Nov. 14, 1950 |
| 2,552,066 | Sorensen | May 8, 1951 |
| 2,728,259 | Poupitch | Dec. 27, 1955 |
| 2,763,908 | Marschner | Sept. 25, 1956 |
| 2,896,889 | Hershberger et al. | July 28, 1959 |

FOREIGN PATENTS

| | | |
|---|---|---|
| 331,430 | Italy | Nov. 6, 1935 |